(12) United States Patent
Forgues et al.

(10) Patent No.: US 9,846,099 B1
(45) Date of Patent: Dec. 19, 2017

(54) PEENING CALIBRATION UNIT, BATTERY PACK AND SYSTEM

(71) Applicant: SHOCKFORM AÉRONAUTIQUE INC, Boisbriand (CA)

(72) Inventors: Sylvain Forgues, Laval (CA); Brigitte Labelle, Blainville (CA)

(73) Assignee: SHOCKFORM AERONAUTIQUE INC., Boisbriand (CA)

( * ) Notice: Subject to any disclaimer, the term of this patent is extended or adjusted under 35 U.S.C. 154(b) by 0 days.

(21) Appl. No.: 15/386,447

(22) Filed: Dec. 21, 2016

(51) Int. Cl.
*B24C 1/10* (2006.01)
*G01L 25/00* (2006.01)
*G01L 5/00* (2006.01)

(52) U.S. Cl.
CPC .......... *G01L 25/006* (2013.01); *G01L 5/0052* (2013.01); *H01M 2220/00* (2013.01)

(58) Field of Classification Search
CPC ....................................................... B24C 1/10
See application file for complete search history.

(56) References Cited

U.S. PATENT DOCUMENTS

| | | |
|---|---|---|
| 4,067,238 A | 1/1978 | Oetiker |
| 4,470,292 A | 9/1984 | DeClark et al. |
| 4,805,429 A | 2/1989 | Thompson |
| 4,848,123 A | 7/1989 | Thompson |
| 4,955,270 A | 9/1990 | Volk, Jr. |
| 5,048,316 A | 9/1991 | Thompson |
| 5,113,680 A | 5/1992 | Matsuura et al. |
| 5,297,418 A | 3/1994 | Champaigne |
| 5,526,664 A | 6/1996 | Vetter |
| 5,581,041 A | 12/1996 | Bouchillon |
| 5,731,509 A | 3/1998 | Thompson |
| 6,110,645 A | 8/2000 | DeBoer et al. |
| 6,130,400 A | 10/2000 | Rockstroh |
| 6,640,596 B2 | 11/2003 | Yamamoto et al. |
| 6,694,789 B2 | 2/2004 | Yamamoto |
| 2002/0144529 A1* | 10/2002 | Yamamoto ................ G01L 5/14 72/53 |
| 2016/0273984 A1 | 9/2016 | Blais et al. |

* cited by examiner

*Primary Examiner* — Robert R Raevis
(74) *Attorney, Agent, or Firm* — IP Delta Plus Inc.

(57) ABSTRACT

The present peening calibration unit comprises a casing, a transducer, and a transmission unit. The casing defines a top and a bottom. The transducer is positioned along at least a section of the top of the casing. The transducer generates an electric signal upon application of peening energy thereto. The transmission unit receives the electric signal generated by the transducer and transmits a digital signal representative of the received electrical signal wirelessly. The transmission unit is located inside the casing. Furthermore, a peening calibration battery pack and a peening calibration system are described.

5 Claims, 8 Drawing Sheets

PEENING CALIBRATION UNIT, BATTERY PACK AND SYSTEM

TECHNICAL FIELD

The present disclosure relates to the field of peening. More precisely, the present disclosure relates to a peening calibration unit, a peening calibration battery pack and a peening calibration system.

BACKGROUND

Peening is a process for improving properties of a metal surface. Peening is typically a cold work process, by which a mechanical pressure (hammer or shots) or blasts of light beam are applied to the metal surface. The energy transferred to the metal surface by the peening process is referred to as peening intensity.

Before starting peening of a component, a peening system is calibrated. A dummy component or a representative fixture is equipped with peening calibration holders. Standardized peening calibration strips are inserted into the peening calibration holders. During peening, the dummy component and the standardized peening calibration strip absorb energy generated by the peening process. After the peening process is performed on the dummy component, the peening calibration strips are removed from the calibration holders and bending (arc height) of the standardized peening calibration strips after peening is measured. A particular gauge is required for measuring arc height of the standardized peening calibration strips, as defined in publication J442_2013 from SAE International, revised on Feb. 18, 2013, titled "Test Strip, Holder, and Gage for Shot Peening". The measured arc heights are plotted on a graph depicting the measured arc height versus peening time. This calibration process is repeated with new standardized peening calibration strips for at least four iterations. A curve, known as the saturation curve, is then identified through the measurements collected and plotted on the graph.

Peening intensity is most often determined using a 10% rule that states that intensity is the first arc height on the curve where the arc height increases by 10% for a doubling of time, as defined in publication J443_2010 from SAE International, revised on Jun. 16, 2010, titled "Procedures for Using Standard Shot Peening Almen Strip". Finding the peening intensity with standardized peening calibration strips requires significant time: at least four iterations of peening standardized peening calibration strips, and manual arc height measurements, generation of graphs and several mathematical calculations that often lead to errors. Furthermore, the traditional peening calibration practices are misleading as most new users believe that the time to peen a part is related to the time required to peen the standardized peening calibration strips, whereas the time depicted rather reflects a measure of the kinetic energy transferred to the component. The traditional method is also detrimental to the environment as each standardized peening calibration strip is only used once and must then be discarded. Millions of standardized peening calibration strips per year are thus sent to the landfill.

Over the years, a few patents have described alternative devices to measure the energy transferred through peening. DeClark et al. in U.S. Pat. No. 4,470,292 has proposed a large plate on a cantilever rod with an analog deflection transducer to measure the deflection of the rod under the load of the gravity accelerated shot created by gravity peening. This method is not practical as it cannot be mounted on the component being peened to measure intensity directly on different points thereof. Matsuura et al. (U.S. Pat. No. 5,113,680) and Yamammoto et al. (U.S. Pat. No. 6,640,596) have proposed a single or dual level transducer for measuring an elastic wave caused by a shot collision. The proposed devices are too large, do not adapt to current standardized peening calibration strip holders, cannot be installed on existing dummy components, are complex, and include many parts such as wires that quickly wear in harsh peening environments.

There is therefore a need for a new peening calibration unit and system that resolve the above problems.

SUMMARY

According to a first aspect, the present disclosure relates to a peening calibration unit. The peening calibration unit comprises a casing, a transducer and a transmission unit. The casing defines a top and a bottom. The transducer is positioned along a section of the top of the casing. The transducer generates an electric signal upon application of peening energy thereto. The transmission unit receives the electric signal generated by the transducer and transmits a digital signal representative of the electrical signal wirelessly. The transmission unit is located inside the casing.

According to a second aspect, the present disclosure relates to a peening calibration system comprising a plurality of peening calibration units, and a computing device. Each of the peening calibration units comprising a casing, a transducer, a transmission unit and a battery. Each casing defines a top and a bottom. Each transducer is positioned along a section of the top of one of the casings. Each transducer generates an electric signal upon absorption of peening energy. Each transmission unit receives the electric signal generated by the corresponding transducer and wirelessly transmits a digital signal representative of the electrical signal. Each transmission unit is located inside a corresponding casing. The computation device comprises a communication unit and a processor. The communication unit communicates with the transmission unit of each peening calibration unit. The processor processes the digital signal received from the plurality of peening calibration units.

According to a third aspect, the present disclosure relates to a peening calibration battery pack. The peening calibration battery pack comprises a battery pack casing, at least one battery and a peening calibration unit holder. The battery pack casing has a top and a bottom, and the top comprises an electrical connector for connecting with a corresponding electrical connector of a peening calibration unit. The at least one battery is located inside the battery pack casing, and is in electrical contact with the electrical connector on the top of the battery pack casing. The peening calibration unit holder receives and holds on the top of the battery pack casing the peening calibration unit.

BRIEF DESCRIPTION OF THE DRAWINGS

Embodiments of the disclosure will be described by way of example only, with reference to the accompanying drawings, in which.

DETAILED DESCRIPTION

The present invention relates to the calibration of peening apparatuses and systems, such as shot peening using air blast machines, wheels blast machines, flapper peening equipment, needle peening equipment, laser peening, or any other type of peening used for enhancing fatigue properties, for forming, straightening or for blast cleaning.

The foregoing and other features will become more apparent upon reading of the following non-restrictive description of illustrative embodiments thereof, given by way of example only, with reference to the accompanying drawings. Like numerals represent like features on the various drawings.

Various aspects of the present disclosure generally address a peening calibration unit, a peening calibration battery pack and a peening calibration system.

Figure 1:
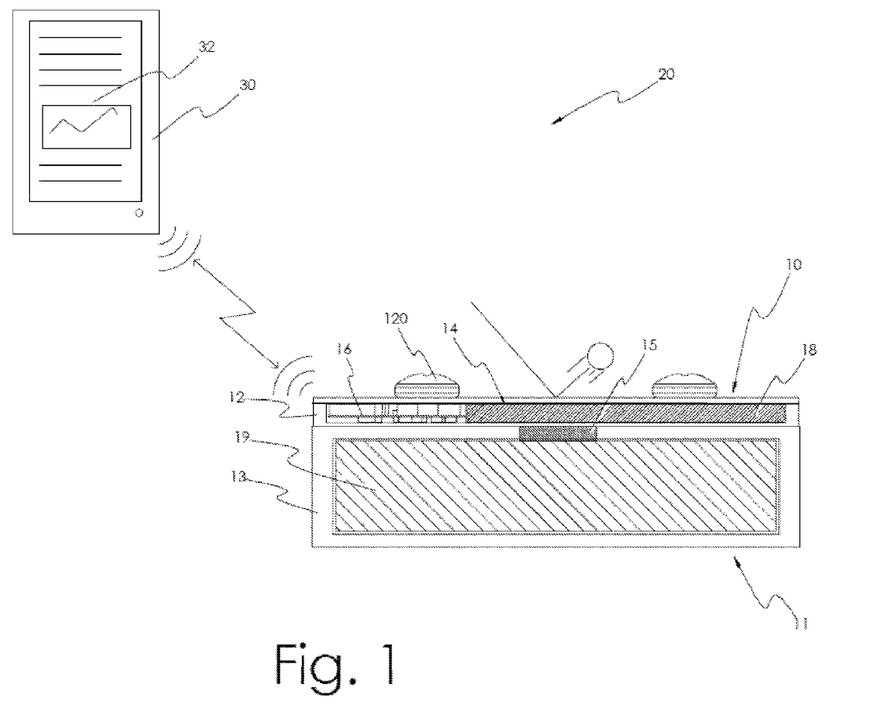
FIG. 1 is a schematic view of one peening calibration unit installed on a peening calibration battery pack along cross-sectional section A-A of FIG. 2B, and in use in a peening calibration system.

Referring now to FIG. 1, there is depicted a peening calibration unit 10 in accordance with the present invention, installed on a peening calibration battery pack 11 and used in a peening calibration system 20. Typically, a peening calibration system 20 comprises several peening calibration units 10, but only one peening calibration unit 10 is shown on FIG. 1 for clarity purposes. FIG. 1 depicts the peening calibration unit 10 mounted on the peening calibration battery pack 11, but the present peening calibration unit 10 and peening calibration system 20 should not be construed as being limited to mounting on the peening calibration battery pack 11.

Figure 2A:
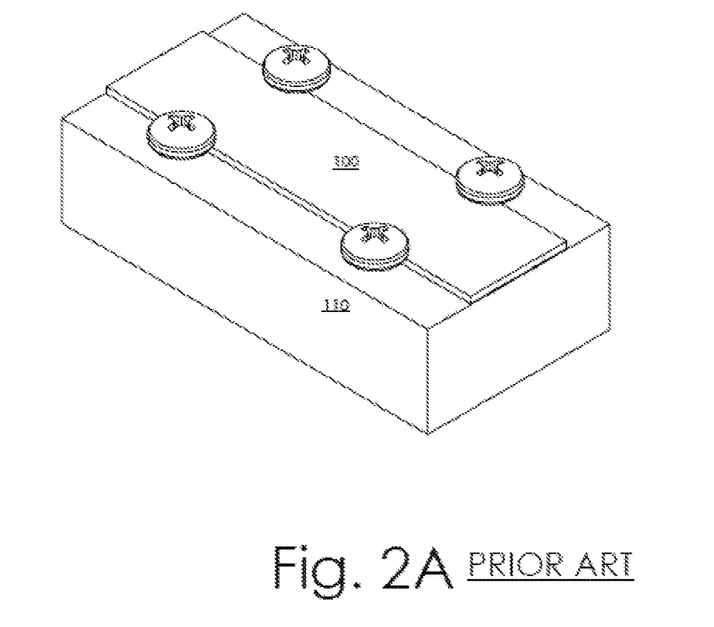
FIG. 2A is a perspective view of an Almen standardized calibration strip inserted into a standardized peening calibration strip holder as known in the art.
Figure 2B:
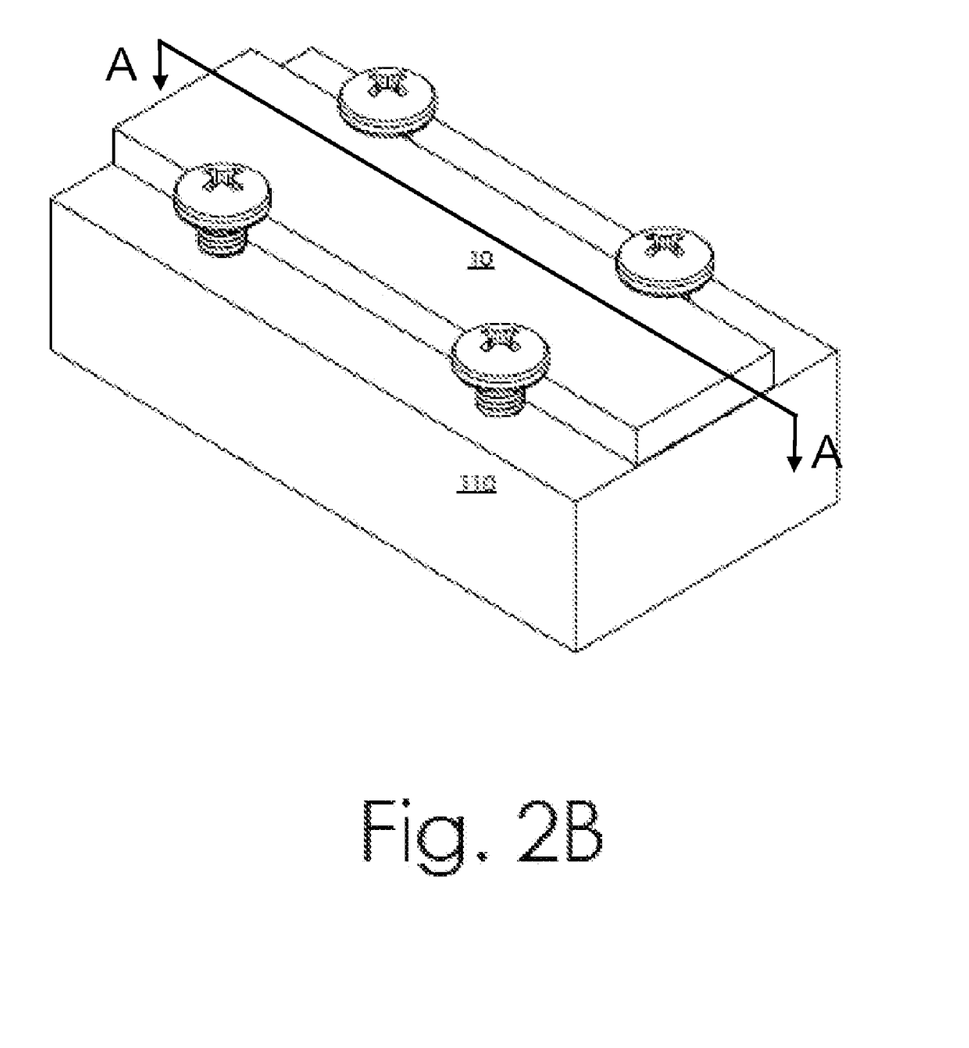
FIG. 2B is a perspective view of an example of the present peening calibration unit inserted into a prior art standardized peening calibration strip holder.
Figure 2C:
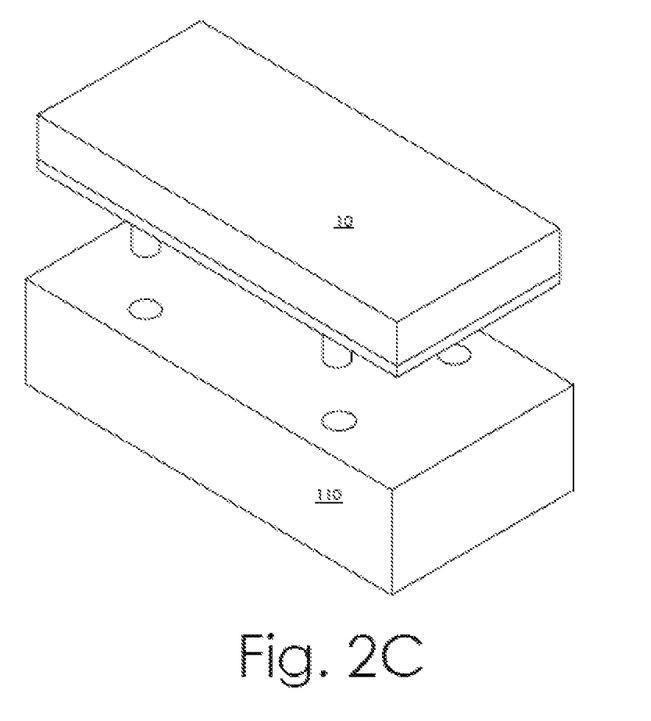
FIG. 2C is an exploded perspective view of a second embodiment of the present peening calibration unit to be inserted into a prior art standardized peening calibration strip holder.
Figure 3:
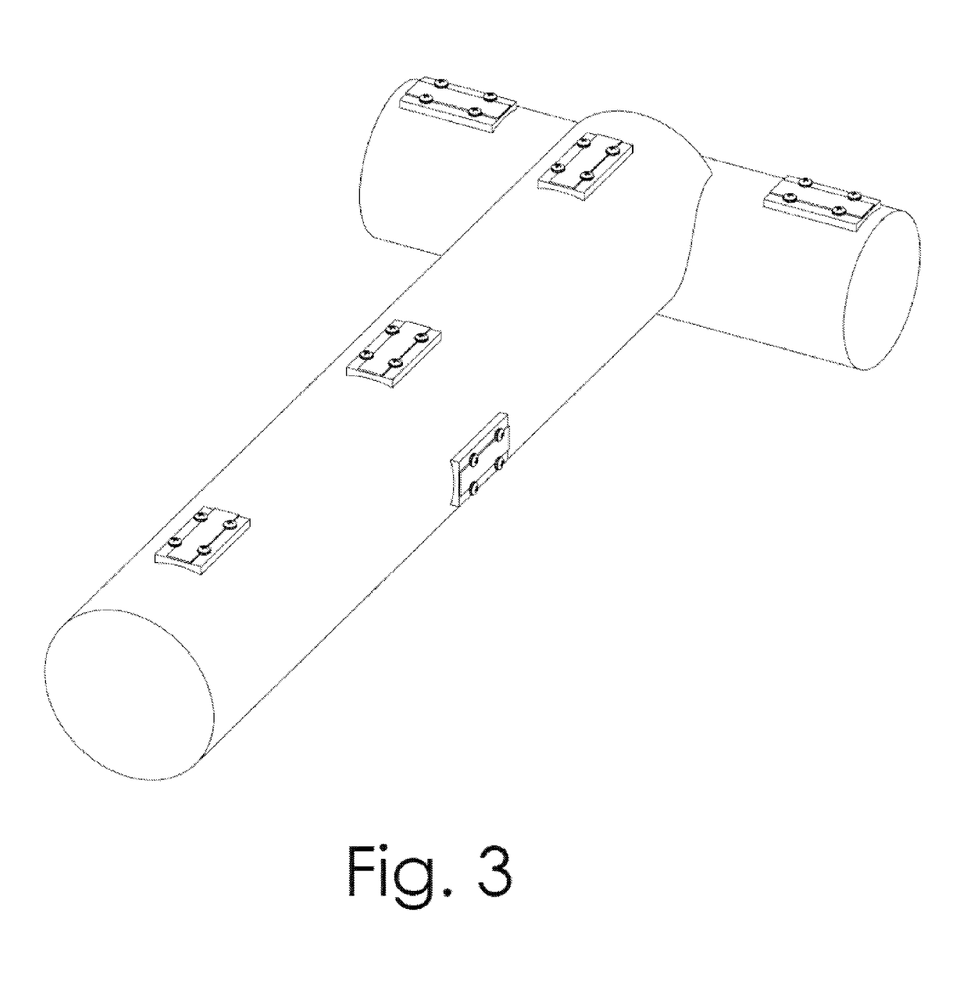
FIG. 3 is a perspective view of a dummy component or representative fixture equipped with multiple peening calibration holders.

The peening calibration unit 10 comprises a casing 12. The casing 12 is made of rugged material, to protect the components located inside the casing 12 during peening. The casing 12 may be composed of an integral component, or may include several parts assembled together to form the casing 12. For example, the casing 12 may be of the same size and shape as a standardized peening calibration strip 100, such as the standardized peening calibration Almen strips as shown on FIG. 2A. The casing 12 may be inserted directly into a standardized peening calibration strip holder 110, as shown on FIG. 2B, and held in place by screws 120 provided on the standardized peening calibration strip holder 110, thus being fully compatible with standardized peening calibration holders currently used in the industry. The peening calibration unit 10 may alternatively be installed onto the standardized peening calibration strip holder 110 using press fit rubber dowels inserted into the screw holes of the standardized peening calibration strip holder 110 as depicted by FIG. 2C. Alternatively, as shown on FIG. 1, the peening calibration unit 10 may be mounted on the peening calibration battery pack 11. The casing 12 of the peening calibration unit 10 defines a top and a bottom. The bottom is in contact with peening calibration battery pack 11 as shown on FIG. 1, or the standardized peening calibration strip holder 110 as shown on FIG. 2B. Depending on the implementation chosen, the bottom of the peening calibration strip holder 110 or the bottom of the peening calibration battery pack 11 are in contact with a dummy component (illustrated in FIG. 3) or representative support fixture and affixed to the dummy component or the representative fixture for performing peening calibration. Any means or method of affixing to the dummy component known in the art may be used to affix the peening calibration strip holder 110 or the peening calibration battery pack 11 to the dummy component.

A transducer 14 is affixed to the top of the casing 12. Although only one transducer 14 is shown on FIG. 1, those skilled in the art will understand that the expression "one transducer" should be interpreted in its broadest meaning, and could thus include several independent or interconnected transducers or transducing cells. The transducer 14 may cover a section of the top of the casing 12, or alternatively the entire top of the casing 12. The transducer 14 may be affixed to the top of the casing 12 in any manner known in the art for affixing transducer to be used in harsh environments, such as for example glued to the casing 12, casted inside the casing 12 or mixed into the material used for the casing 12 in the form of powder or nano-particles. The transducer 14 is exposed to peening impact energy and generates electricity upon application of peening energy thereto. More particularly, the transducer 14 converts variations in a physical quantity, such as for example pressure, shot flow, impingement angle, nozzle distance into an electrical signal. Although an example of shot peening is provided in FIG. 1, the present peening calibration unit 10 and peening calibration system 20 are not limited to this method of peening. The present peening calibration unit and peening calibration system 20 may be used with any type of peening. Of course, people skilled in the art will understand that the transducer 14 will be selected based on the type of peening process to be calibrated, and the type of calibration to be performed.

Figure 4A:
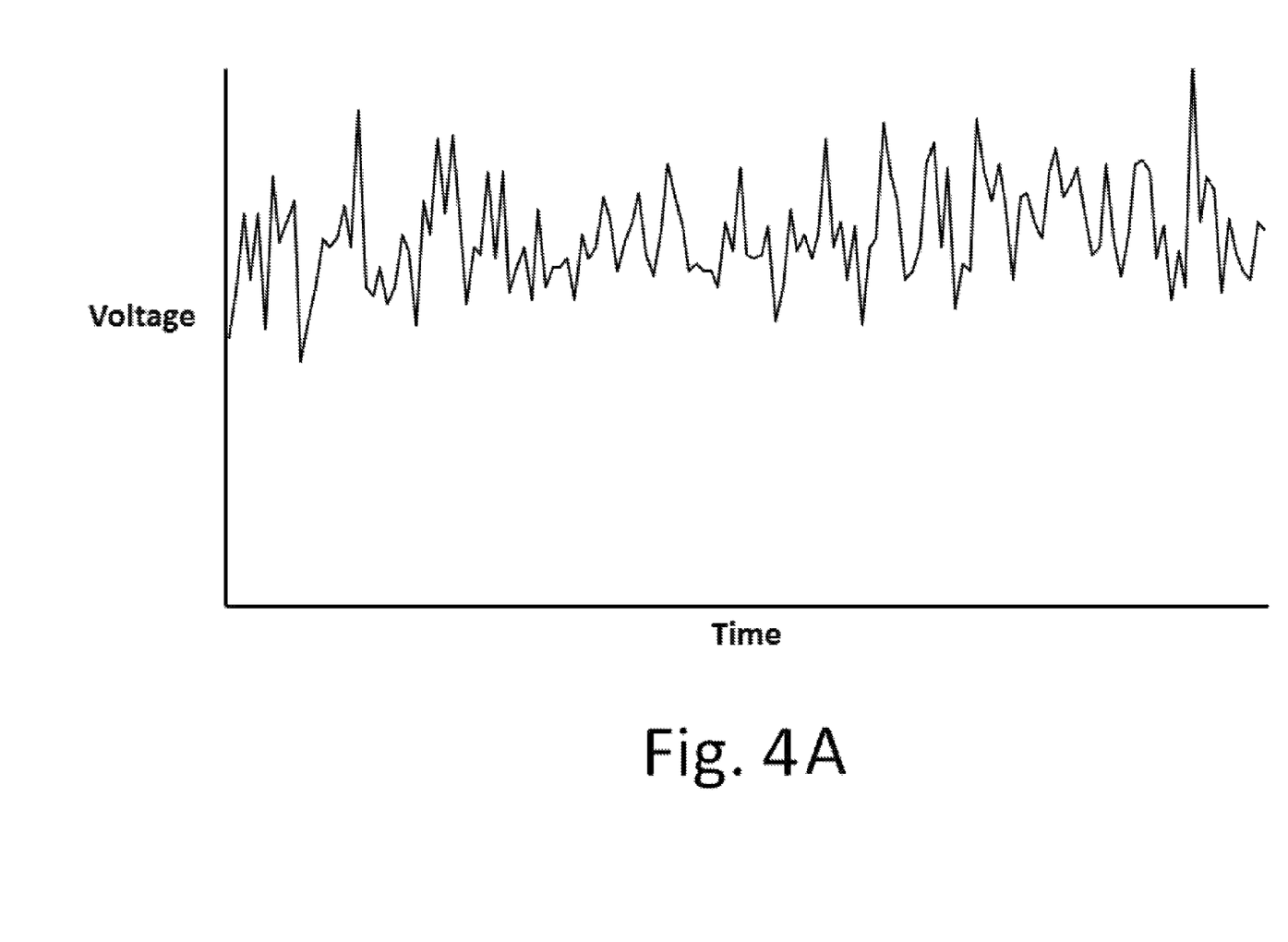
FIG. 4A is a graph depicting the electrical signal generated by the transducer of the present peening calibration unit under air blast peening.
Figure 4B:
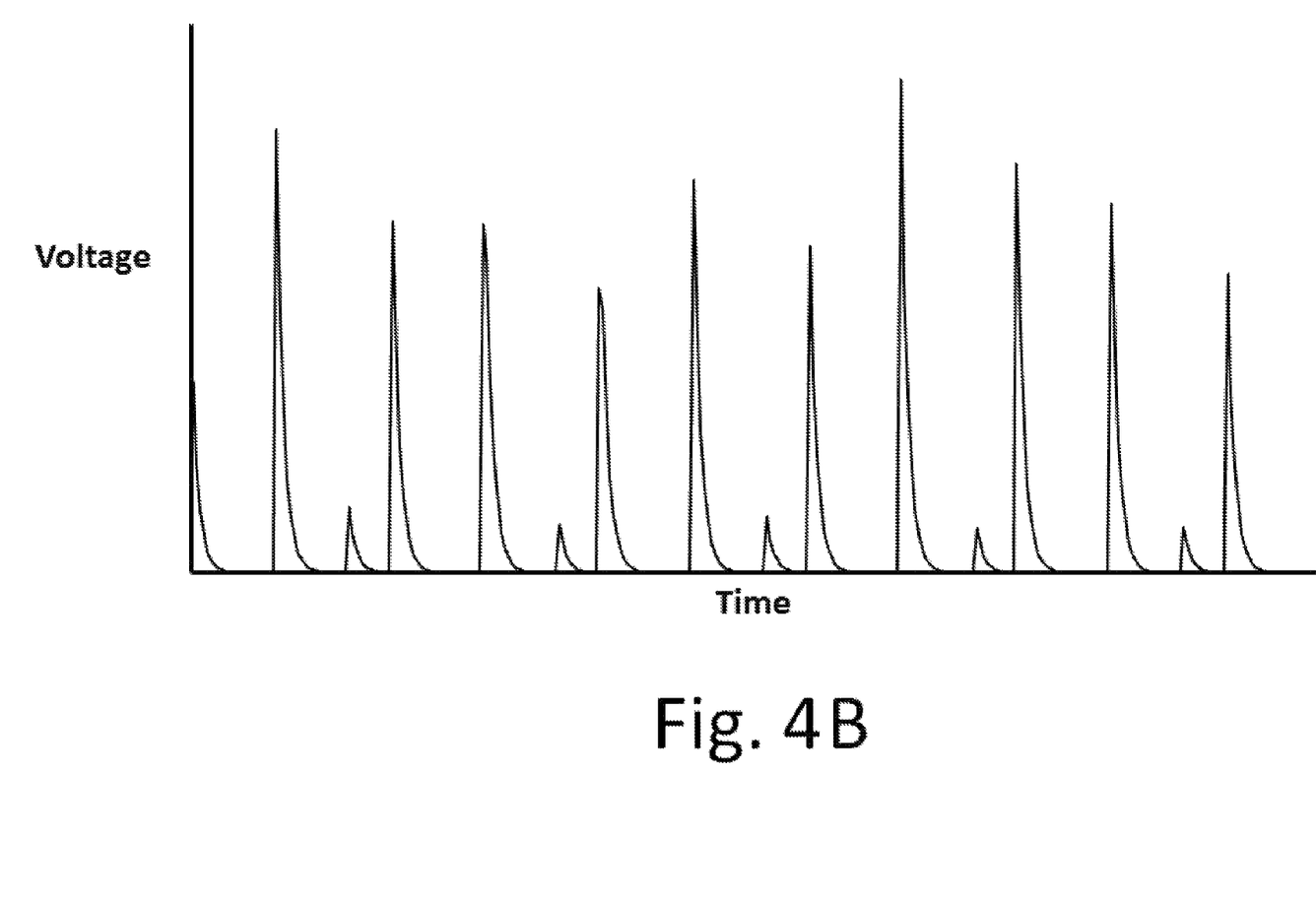
FIG. 4B is a graph depicting the electrical signal generated by the transducer of the present peening calibration unit under flapper peening.
Figure 4C:
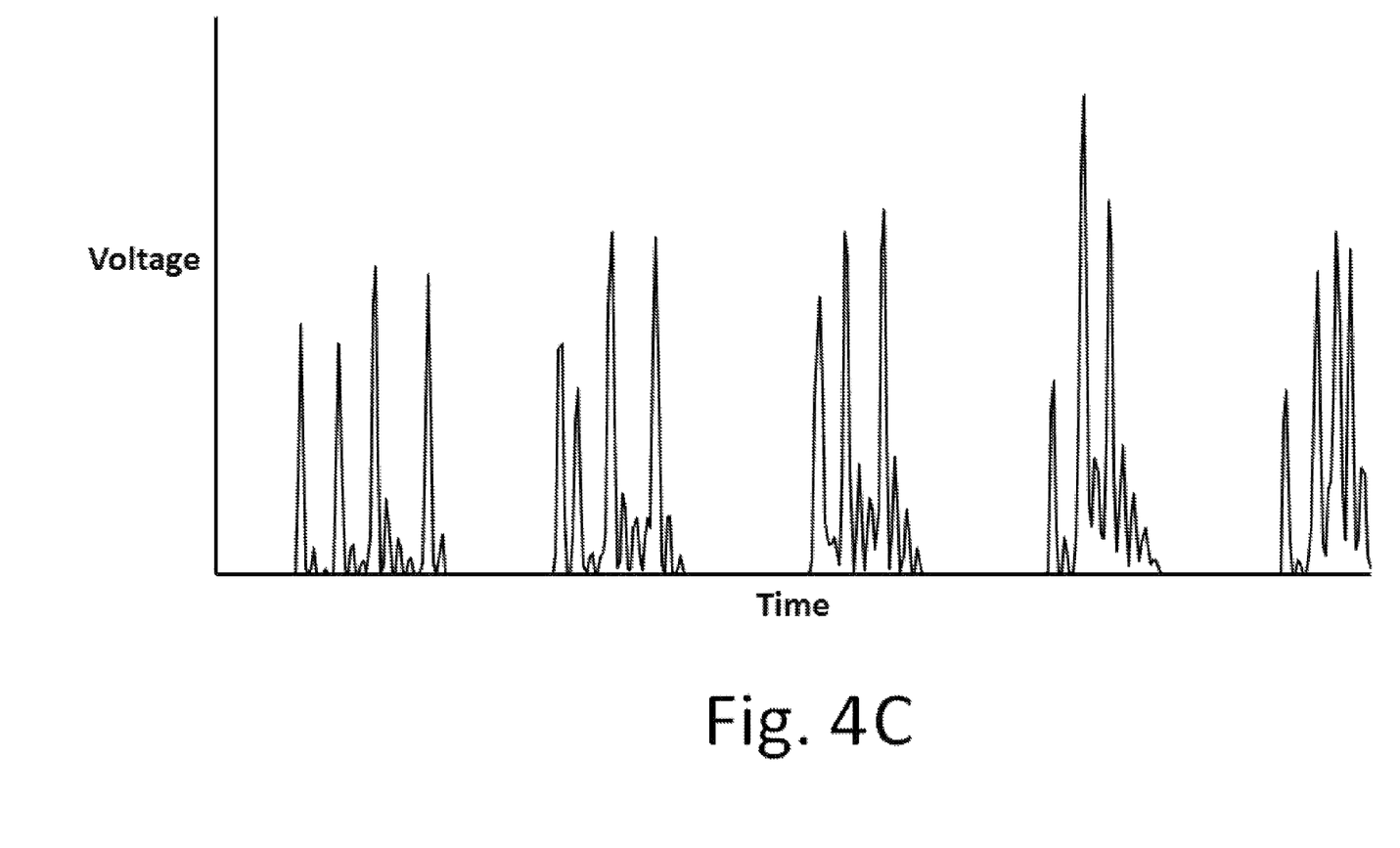
FIG. 4C is a graph depicting the electrical signal generated by the transducer of the present peening calibration unit under needle peening.

Reference is now made concurrently to FIGS. 4A, 4B, and 4C, which respectively depict the electrical signal generated by the transducer 14 under three different types of peening, namely and respectively air blast peening, flapper peening and needle peening. As can be appreciated from perusing FIGS. 4A, 4B and 4C, voltage of the electrical signal produced over time for each time of peening is quite specific to the type of peening applied.

The transducer 14 is electrically connected to a transmission unit 16. The transmission unit 16 is located inside the casing 12. The transmission unit 16 receives the electrical signal generated by the transducer 14 and transmits a digital signal representative of the electrical signal wirelessly. Although not shown in details on FIG. 1, the transmission unit 16 may comprise an electric circuit for treating the electrical signal generated by the transducer 14. Furthermore, the transmission unit 16 may further comprise a processor (not shown) for converting the electrical signal into a digital signal, memory (not shown) for buffering the digital signal to be wireless transmitted, and an antenna (not shown) for wirelessly transmitting the digital signal. The processor may further analyze the electrical signal generated by the transducer and generate an analyzed digital signal. In an example, the processor analyzes the electrical signal, calculates peening intensity, then transmits the peening intensity as the digital signal. The digital signal may be transmitted using any known standard or protocol, such as for example Bluetooth™, Wi-Fi™, or any type of cellular technology.

In addition to transmitting the digital signal representative of the electrical signal generated by the transducer 14, the transmission unit 16 may further authenticate the peening calibration unit 10 with the peening calibration system 20. As several peening calibration units 10 are used concurrently for calibrating a peening apparatus of system, the peening calibration unit 10 may perform a handshake procedure or an authentication procedure with the peening calibration system 20 before powering the transducer 14 and transmitting the digital signal representative of the electrical signal generated by the transducer 14.

The transducer 14 and the transmission unit 16 are powered by one or several batteries. In a first example, an internal battery 18 is located inside the casing 12. In another example, the casing 12 comprises a connector 15 at the bottom thereof that electrically connects the transducer 14 and the transmission unit 16 to the peening calibration battery pack 11. In yet another example, the peening calibration unit 10 comprises an internal battery 18, and further electrically connects through the connector 15 with the peening calibration battery pack 11.

The electric signal generated by the transducer 14 may be harvested and stored in the internal battery 18 and in the peening calibration battery pack 11, either separately, sequentially or concurrently. Harvesting some of the electric signal generated by the transducer 14 extends the battery life of the internal battery 18, and the peening calibration battery pack 11. Furthermore, for efficiently harvesting some of the electric signal generated by the transducer 14, the transmission unit 16 may be used as a controller to determine when the electric signal generated by the transducer 14 may be stored. Those skilled in the art will understand that the electrical signal generated by the transducer 14 is first used by the transmission unit 16, but any electrical signal received by the transmission unit 16 may be harvested and stored in the internal battery 18 and/or the peening calibration battery pack 11.

The peening calibration battery pack 11 comprises a peening battery pack casing 13 having a top and a bottom. The top of the peening battery pack casing 13 comprising an electrical connector positioned to provide electrical connection with the electrical connector 15 of the peening calibration unit 10. The peening calibration battery pack 11 further comprises at least one battery 19 located inside the battery pack casing 13. Depending on the implementation preferred, the peening calibration battery pack 11 could contain one or several batteries, either rechargeable or non-rechargeable, and an electrical adaptor (not shown) for allowing recharging of the at least one battery 19 while within the peening battery pack casing 13. The at least one battery 19 is in electrical contact with the electrical connector located on the top of the peening calibration battery casing 13.

The peening calibration battery pack 11 further comprises a peening calibration unit holder 120. The peening calibration unit holder 120 receives and holds on the top of the peening calibration battery pack 11 the peening calibration unit 10. FIG. 1 depicts two screws 120 acting as peening calibration unit holder, but the present peening calibration battery pack 11 and peening calibration unit 10 are not limited to such an implementation. Any mechanism known in the industry for retaining a unit above a battery pack could be used. In an example, the peening calibration battery pack 11 is shaped and sized as a standardized peening calibration strip holder 110.

The peening calibration system 20 comprises at least one peening calibration unit 10, although for many implementations, the peening calibration system 20 will comprise a plurality of calibration units 10. The peening calibration system 20 further comprises a computing device 30. The computing device 30 depicted in FIG. 1 is a tablet or a smartphone, but the present peening calibration system 20 is not limited to such computing device. The computing device 30 comprises a communication unit for wirelessly communicating with the transmission unit 16 of each peening calibration unit 10. The computing device 30 further comprises a processor for processing the digital signals wirelessly received from the plurality of peening calibration units 10. The processor of the computing device 30 may further perform authentication of each peening calibration unit 10 before accepting receipt of the digital signals therefrom. The processor of the computing device 30 may also analyze the digital signals received from the peening calibration units 10, and calculate a peening intensity. The computing device 30 may produce specialized reports containing the peening intensity presented in a custom format to be saved digitally or printed by a printer. The computing device 30 further comprises a memory for storing the received digital signals together with an identification of the corresponding peening calibration unit 10, and at least one of the following temporal information related to the digital signals received: a timestamp or a time interval. The computing device 30 further comprises a display 32. The display 32 may display one or several of the following: an image of the dummy component or the representative support fixture with a position thereon of the peening calibration units 10, a list of the calibration units 10 with identification, the peening intensity calculated for each calibration unit 10, an acceptable range of intensity for each peening calibration unit 10, the logged data of past peening procedures for each calibration unit 10, an icon confirming receipt of the digital signals from authenticated peening calibration units 10, power level of each peening calibration units 10 and peening calibration battery packs 11 in the peening calibration system 20.

Although the present disclosure has been described hereinabove by way of non-restrictive, illustrative embodiments thereof, these embodiments may be modified at will within the scope of the appended claims without departing from the spirit and nature of the present disclosure.

What is claimed is:
1. A peening calibration system comprising:
   a plurality of peening calibration units, each peening calibration unit comprising:
      a casing defining a top and a bottom;
      a transducer along at least a section of the top of the casing, the transducer generating an electric signal upon application of peening energy thereto;
      a transmission unit for receiving the electric signal generated by the transducer and transmitting a digital signal representative of the electrical signal wirelessly, the transmission unit being located inside the casing; and
      a battery, the battery powering the transducer and the transmission unit; and
   a computing device comprising:

a communication unit for receiving the digital signal representative of the electrical signal transmitted by the transmission unit of each peening calibration unit;

a processor for processing the digital signal received from the plurality of peening calibration units; and a memory for storing the received digital signal together with an identification of the peening calibration unit the digital signal is received from and at least one of the following: a timestamp or a time interval.

2. The peening calibration system of claim 1, wherein the processor authenticates each one of the peening calibration units before receiving the digital signals therefrom.

3. The peening calibration system of claim 1, wherein the processor further analyzes the digital signals received from the plurality of peening calibration units, and calculates the peening intensity.

4. The peening calibration system of claim 3, wherein the computing unit further comprises a display.

5. The peening calibration system of claim 1, wherein each peening calibration unit is shaped and sized as a peening calibration strip.

* * * * *